(12) United States Patent
Chien (10) Patent No.: US 9,398,114 B2
(45) Date of Patent: Jul. 19, 2016

(54) METHODS FOR AUTOMATICALLY MANAGING INSTALLED APPLICATIONS AND DETERMINING APPLICATION RECOMMENDATION RESULT BASED ON AUXILIARY INFORMATION AND RELATED COMPUTER READABLE MEDIA

(71) Applicant: MEDIATEK INC., Hsin-Chu (TW)

(72) Inventor: Min-Hung Chien, Taichung (TW)

(73) Assignee: MEDIATEK INC., Science-Based Industrial Park, Hsin-Chu (TW)

( * ) Notice: Subject to any disclaimer, the term of this patent is extended or adjusted under 35 U.S.C. 154(b) by 273 days.

(21) Appl. No.: 13/923,334

(22) Filed: Jun. 20, 2013

(65) Prior Publication Data

US 2014/0149582 A1     May 29, 2014

Related U.S. Application Data

(60) Provisional application No. 61/729,420, filed on Nov. 23, 2012.

(51) Int. Cl.
*G06F 15/173* (2006.01)
*H04L 29/08* (2006.01)
*G06F 9/445* (2006.01)

(52) U.S. Cl.
CPC *H04L 67/34* (2013.01); *G06F 8/60* (2013.01); *G06F 8/62* (2013.01); *H04L 67/303* (2013.01); *H04L 67/306* (2013.01)

(58) Field of Classification Search
CPC ... H04L 63/20; H04L 63/0272; H04L 63/105; H04L 67/10; G06Q 10/10
See application file for complete search history.

(56) References Cited

U.S. PATENT DOCUMENTS

| | | | |
|---|---|---|---|
| 6,636,836 B1 * | 10/2003 | Pyo | 705/7.29 |
| 8,265,595 B1 * | 9/2012 | Reeves et al. | 455/410 |
| 8,768,374 B1 * | 7/2014 | Tran et al. | 455/452.2 |
| 2007/0088532 A1 * | 4/2007 | Alvarez et al. | 703/2 |
| 2007/0168874 A1 * | 7/2007 | Kloeffer et al. | 715/764 |
| 2008/0184216 A1 * | 7/2008 | Muedsam | 717/168 |
| 2009/0043840 A1 * | 2/2009 | Cherukuri et al. | 709/203 |
| 2010/0235433 A1 * | 9/2010 | Ansari et al. | 709/203 |
| 2013/0298185 A1 * | 11/2013 | Koneru et al. | 726/1 |

* cited by examiner

*Primary Examiner* — Peling Shaw
(74) *Attorney, Agent, or Firm* — Winston Hsu; Scott Margo (57) ABSTRACT

An application management method includes at least the following steps: receiving auxiliary information associated with a plurality of applications installed on a user device; analyzing the auxiliary information based on a plurality of predetermined rules, and generating at least one analysis result for each of the applications; and automatically performing application management upon the applications installed on the user device according to analysis results of the applications.

20 Claims, 6 Drawing Sheets

METHODS FOR AUTOMATICALLY MANAGING INSTALLED APPLICATIONS AND DETERMINING APPLICATION RECOMMENDATION RESULT BASED ON AUXILIARY INFORMATION AND RELATED COMPUTER READABLE MEDIA

CROSS REFERENCE TO RELATED APPLICATIONS

This application claims the benefit of U.S. provisional application No. 61/729,420, filed on Nov. 23, 2012 and incorporated herein by reference.

BACKGROUND

The disclosed embodiments of the present invention relate to application management and recommendation, and more particularly, to methods for automatically managing installed applications and determining an application recommendation result based on auxiliary information and related computer readable media.

With the development of smartphones and tablets, the number of applications (i.e., the amount of application software) is increased greatly. One smartphone/tablet may have a plenty of applications installed therein. However, not all of the installed applications are frequently used by the user. For example, some applications which may be installed a long time ago and are no longer used by the user now would occupy a larger memory space of the smartphone/tablet and have a large number of update notifications. Besides, the user may need to use a specific application at a certain time or a certain location. As the smartphone/tablet has a plenty of applications installed therein, searching the specific application from the installed applications is not an easy task for the user.

Thus, there is a need for an automatic application management and recommendation scheme to improve the user experience of using the smartphone/tablet with many applications installed therein.

SUMMARY

In accordance with exemplary embodiments of the present invention, methods for automatically managing installed applications and determining an application recommendation result based on auxiliary information and related computer readable media are proposed to solve the above-mentioned problem.

According to a first aspect of the present invention, an exemplary application management method is disclosed. The exemplary application management method includes: receiving auxiliary information associated with a plurality of applications installed on a user device; analyzing the auxiliary information based on a plurality of predetermined rules, and generating at least one analysis result for each of the applications; and automatically performing application management upon the applications installed on the user device according to analysis results of the applications.

According to a second aspect of the present invention, an exemplary application recommendation method is disclosed. The exemplary application recommendation method includes: receiving auxiliary information; analyzing the auxiliary information based on a plurality of predetermined rules, and generating at least one analysis result for each of a plurality of candidate applications; and automatically determining an application recommendation result of recommended applications selected from the candidate applications by referring to analysis results of the candidate applications.

According to a third aspect of the present invention, an exemplary computer readable medium storing a program code is disclosed. When executed by a processor, the program code instructs the processor to perform following steps for application management: receiving auxiliary information associated with a plurality of applications installed on a user device; analyzing the auxiliary information based on a plurality of predetermined rules, and generating at least one analysis result for each of the applications; and automatically performing application management upon the applications installed on the user device according to analysis results of the applications.

According to a fourth aspect of the present invention, an exemplary computer readable medium storing a program code is disclosed. When executed by a processor, the program code instructs the processor to perform following steps for application recommendation: receiving auxiliary information; analyzing the auxiliary information based on a plurality of predetermined rules, and generating at least one analysis result for each of a plurality of candidate applications; and automatically determining an application recommendation result of recommended applications selected from the candidate applications by referring to analysis results of the candidate applications.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
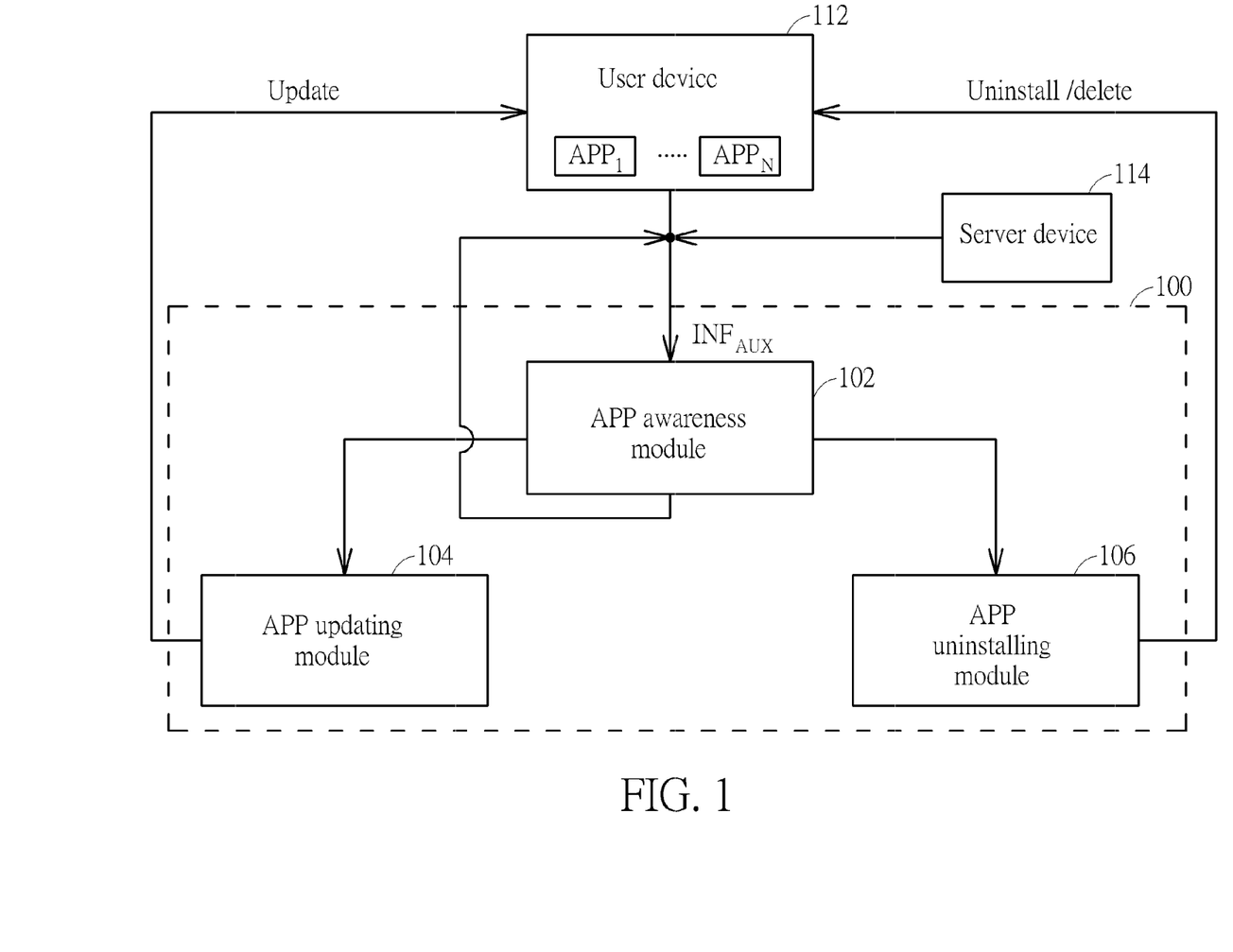
FIG. 1 is a block diagram illustrating an application management module according to an embodiment of the present invention.

FIG. 1 is a block diagram illustrating an application management module according to an embodiment of the present invention. The application management module 100 is arranged to automatically manage a plurality of applications $APP_1$-$APP_N$ installed on a user device (e.g., a smartphone or tablet) 112, where each of the applications $APP_1$-$APP_N$ is downloaded from a server device 114 to the user device 112 and then installed in the user device 112. As shown in FIG. 1, the application management module 100 includes an application (APP) awareness module 102, an APP updating module 104 and an APP uninstalling module 106. The APP awareness module 102 is arranged for receiving auxiliary information $INF_{AUX}$ associated with applications $APP_1$-$APP_N$ installed on the user device 112, and analyzing the auxiliary information $INF_{AUX}$ based on a plurality of predetermined rules. Hence, the APP awareness module 102 would generate at least one analysis result for each of the applications $APP_1$-$APP_N$ based on at least one predetermined rule. After obtaining the analysis results of the applications $APP_1$-$APP_N$, the APP awareness module 102 refers to the analysis results to instruct either the APP updating module 104 or the APP uninstalling module 106 to automatically manage each of the applications $APP_1$-$APP_N$. Specifically, when the APP updating module 104 is instructed by the APP awareness module 102, an installed application is automatically updated to the latest version available on the server device 114; and when the APP uninstalling module 106 is instructed by the APP awareness module 102, an installed application is automatically uninstalled or deleted to free the occupied storage space. To put it simply, the application management module 100 is capable of automatically managing each of the applications $APP_1$-$APP_N$ according to corresponding analysis result(s). In this way, the use of the limited system resource of the user device 112 can be optimized. Further details of the APP awareness module 102 are described as below.

Figure 2:
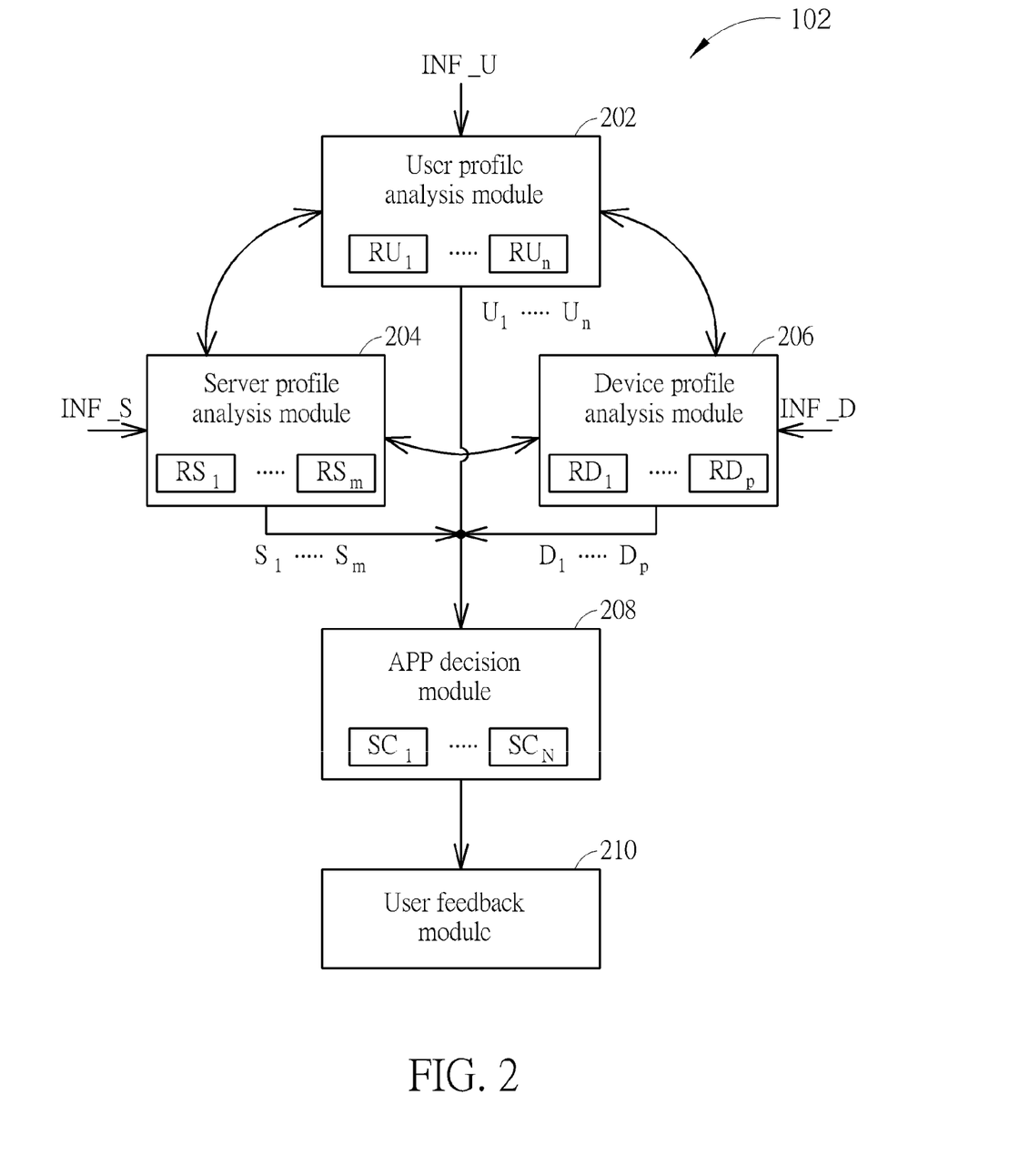
FIG. 2 is a block diagram illustrating an exemplary implementation of the APP awareness module shown in FIG. 1.

FIG. 2 is a block diagram illustrating an exemplary implementation of the APP awareness module 102 shown in FIG. 1. The APP awareness module 102 includes a user profile analysis module 202, a server profile analysis module 204, a device profile analysis module 206, an APP decision module 208, and a user feedback module 210. By way of example, but not limitation, the aforementioned auxiliary information $INF_{AUX}$ may include a user profile data INF_U, a server profile data INF_S and/or a device profile data INF_D. In a preferred embodiment, the auxiliary information $INF_{AUX}$ to be analyzed by the APP awareness module 102 includes different profile data. Specifically, all of user profile data INF_U, server profile data INF_S and device profile data INF_D may be processed by the APP awareness module 102 for better application management performance. However, this is not meant to be a limitation of the present invention.

The user profile data INF_U is maintained and provide by the user device 112, and may include information of user behavior of using the applications $APP_1$-$APP_N$ installed in the user device 112. For example, regarding each of the applications $APP_1$-$APP_N$, the user profile data INF_U may indicate the last use time of the application, the location(s) where the application has been used, whether the application is a favorite application set by the user, etc. The server profile data INF_S is maintained and provided by the server device 114, and may include application information of the applications $APP_1$-$APP_N$ installed in the user device 112. For example, regarding each of the applications $APP_1$-$APP_N$, the server profile data INF_S may indicate the latest version of the application, the user average evaluation of the application, whether the application is the best in the same category, the application size, etc. The device profile data INF_D is maintained and provided by the user device 112, and includes device capability information related to execution of the applications $APP_1$-$APP_N$ installed in the user device 112. For example, the device profile data INF_D may indicate the clock rate of the central processing unit (CPU), the clock rate of the graphics processing unit (GPU), the panel resolution, the wireless connectivity speed, etc. In other words, the device profile data INF_D includes resource information which indicates whether an application can smoothly run on the user device 112.

As mentioned above, the application management module 102 analyzes the auxiliary information $INF_{AUX}$ based on many predetermined rules to generate analysis result(s) for each installed application. In this embodiment, the user profile analysis module 202 is configured to have predetermined rules $RU_1$-$RU_n$ defined therein, the server profile analysis module 204 is configured to predetermined rules $RS_1$-$RS_m$ defined therein, and the device profile analysis module 206 is configured to have predetermined rules $RD_1$-$RD_p$ defined therein. It should be noted that the number of the predetermined rules defined in each analysis module may be adjusted, depending upon actual design requirement/consideration.

For each of the applications $APP_1$-$APP_N$, the user profile analysis module 202 generates analysis results $U_1$-$U_n$ by checking the predetermined rules $RU_1$-$RU_n$ based on the user profile data INF_U, the server profile analysis module 204 generates analysis results $S_1$-$S_m$ by checking the predetermined rules $RS_1$-$RS_m$ based on the server profile data INF_S, and the device profile analysis module 206 generates analysis results $D_1$-$D_p$ by checking the predetermined rules $RD_1$-$RD_p$ based on the device profile data INF_D. In one exemplary design, the user profile analysis module 202, the server profile analysis module 204 and the device profile analysis module 206 may operate separately. Several examples are given as below. However, this is not meant to be a limitation of the present invention. In another exemplary design, the user profile analysis module 202, the server profile analysis module 204 and the device profile analysis module 206 may exchange information with one another. Therefore, when one of the analysis modules is checking if a predetermined rule is met, additional information provided by another of the analysis modules may also be referenced to make a decision.

Regarding the user profile analysis module 202, one predetermined rule $RU_1$ may check if the last use time of an application is six months ago. When the predetermined rule $RU_1$ is met, the analysis result $U_1$ is set by a first logic value (e.g., 0) to indicate that the application should be uninstalled/deleted; otherwise, the analysis result $U_1$ is set by a second logic value (e.g., 1) to indicate that the application should be updated. Another predetermined rule $RU_2$ may check if a current location of the user device 112 is identical to location(s) where the application has been used. When the predetermined rule $RU_2$ is met, the analysis result $U_2$ is set by the second logic value (i.e., 1) to indicate that the application should be updated; otherwise, the analysis result $U_2$ is set by the first logic value (i.e., 0) to indicate that the application should be uninstalled/deleted. Another predetermined rule $RU_3$ may check if the application is a favorite application set by the user. When the predetermined rule $RU_3$ is met, the analysis result $U_3$ is set by the second logic value (i.e., 1) to indicate that the application should be updated; otherwise, the analysis result $U_3$ is set by the first logic value (i.e., 0) to indicate that the application should be uninstalled/deleted.

Regarding the server profile analysis module 204, one predetermined rule $RS_1$ may check if the latest version of the application is a new version. When the predetermined rule $RS_1$ is met, the analysis result $S_1$ is set by the second logic value (i.e., 1) to indicate that the application should be updated; otherwise, the analysis result $S_1$ is set by the first logic value (i.e., 0) to indicate that the application should be uninstalled/deleted. Another predetermined rule $RS_2$ may check if the user average evaluation of the application is higher than a threshold (e.g., 3-star rating). When the predetermined rule $RS_2$ is met, the analysis result $S_2$ is set by the second logic value (i.e., 1) to indicate that the application should be updated; otherwise, the analysis result $S_2$ is set by the first logic value (i.e., 0) to indicate that the application should be uninstalled/deleted. Another predetermined rule $RS_3$ may check if the application is the best in the same category. When the predetermined rule $RS_3$ is met, the analysis result $S_3$ is set by the second logic value (i.e., 1) to indicate that the application should be updated; otherwise, the analysis result $S_3$ is set by the first logic value (i.e., 0) to indicate that the application should be uninstalled/deleted. Another predetermined rule $RS_4$ may check if the application size is larger than a threshold (e.g., 100 M bytes). When the predetermined rule $RS_4$ is met, the analysis result $S_4$ is set by the first logic value (i.e., 0) to indicate that the application should be uninstalled/deleted; otherwise, the analysis result $S_4$ is set by the second logic value (i.e., 1) to indicate that the application should be updated.

Regarding the device profile analysis module 208, one predetermined rule $RD_1$ may check if the application is able to smoothly run on the user device 112 after updated. When the predetermined rule $RD_1$ is met, the analysis result $D_1$ is set by the second logic value (i.e., 1) to indicate that the application should be updated; otherwise, the analysis result $S_4$ is set by the first logic value (i.e., 0) to indicate that the application should be uninstalled/deleted.

After receiving the analysis results $U_1$-$U_n$, $S_1$-$S_m$, $D_1$-$D_p$ generated for each installed application, the APP decision module 208 calculates a final score for each installed application based on the corresponding analysis results $U_1$-$U_n$, $S_1$-$S_m$, $D_1$-$D_p$. Hence, the APP decision module 208 obtains final scores $SC_1$-$SC_N$ corresponding to the applications $APP_1$-$APP_N$, respectively. By way of example, but not limitation, each of the final scores $SC_1$-$SC_N$ may be calculated using following formulas.

$$SCORE_{(user)} = U_1 + U_2 + U_3 + \ldots + U_n \quad (1)$$

$$SCORE_{(server)} = S_1 + S_2 + S_3 + \ldots + S_m \quad (2)$$

$$SCORE_{(device)} = U_1 + U_2 + U_3 + \ldots + U_p \quad (3)$$

$$SCORE_{(final)} = SCORE_{(user)} + SCORE_{(server)} + SCORE_{(device)} \quad (4)$$

As mentioned above, an analysis result is set by the first logic value (i.e., 0) when it is determined that the application needs to be uninstalled/deleted, and is set by the second logic value (i.e., 1) when it is determined that the application needs to be updated. Thus, if $SCORE_{(user)} \geq (n/2)$, the user profile agrees with the action of updating the application; and if $SCORE_{(user)} < (n/2)$, the user profile agrees with the action of uninstalling/deleting the application. Similarly, if $SCORE_{(server)} \geq (m/2)$, the server profile agrees with the action of updating the application; and if $SCORE_{(server)} < (m/2)$, the server profile agrees with the action of uninstalling/deleting the application. If $SCORE_{(device)} \geq (p/2)$, the user profile agrees with the action of updating the application; and if $SCORE_{(device)} < (p/2)$, the device profile agrees with the action of uninstalling/deleting the application. In a case where the majority decision rule is employed, the action of updating the application is taken only when $SCORE_{(final)} \geq 2$. In other words, the APP decision module 208 determines that an applicant should be updated when a final score of the application is not smaller than 2, and determines that the application should be uninstalled/deleted when the final score of the application is smaller than 2. It should be noted that using the majority decision rule to determine whether an application should be updated or uninstalled is for illustrative purposes only. Using a different judgment rule to make a decision is also feasible.

In an alternative design, each of $SCORE_{(user)}$, $SCORE_{(server)}$ and $SCORE_{(device)}$ may be set by a weighted sum of analysis results.

$$SCORE_{(user)} = WU_1 * U_1 + WU_2 * U_2 + WU_3 * U_3 + \ldots + WU_n * U_n \quad (5)$$

$$SCORE_{(server)} = WS_1 * S_1 + WS_2 * S_2 + WS_3 * S_3 + \ldots + WS_m * S_m \quad (6)$$

$$SCORE_{(device)} = WD_1 * U_1 + WD_2 * U_2 + WD_3 * U_3 + \ldots + WD_p * U_p \quad (7)$$

The weighting factors $WU_1$-$WU_n$, $WS_1$-$WS_m$ and $WD_1$-$WD_p$ may be configured based on significance of the analysis results (i.e., significance of the predetermined rules). The same objective of obtaining a final score for each installed application is achieved.

In this embodiment, the application management module 102 further includes the user feedback module 210 which may check a user preference setting to verify the decision made by the APP decision module 208. Consider a case where the APP decision module 208 determines that a specific application should be uninstalled/deleted. When the user preference setting indicates the specific application is a favorite application set by the user, the user feedback module 210 is operative to change the decision made by the APP decision module 208 for preventing the specific application from being uninstalled/deleted erroneously.

Besides, the user feedback module 210 may further analyze the user feedback for rule adjustment. For example, based on a current setting of the predetermined rules, one specific application may be automatically uninstalled/deleted under the control of the application management module 102. However, after the specific application is uninstalled/deleted, the user feedback module 210 finds that the user manually re-installs the specific application, which means that the action of automatically uninstalling/deleting the specific application does not meet user's requirement and the current setting of the predetermined rules makes the APP decision module 208 misjudges that the specific application should be uninstalled/deleted. Hence, based on the user feedback, the user feedback module 210 may adjust at least one of the predetermined rules defined in the user profile analysis module 202, the server profile analysis module 204 and the device profile analysis module 206.

For another example, based on a current setting of the predetermined rules, one specific application may be automatically updated under the control of the application management module 102. However, after the specific application is updated, the user feedback module 210 finds that the user manually uninstalls the specific application, which means that the action of automatically updating the specific application does not meet user's requirement and the current setting of the predetermined rules makes the APP decision module 208 misjudges that the specific application should be updated. Hence, based on the user feedback, the user feedback module 210 may adjust at least one of the predetermined rules defined in the user profile analysis module 202, the server profile analysis module 204 and the device profile analysis module 206.

To put it simply, the application management module 102 is capable of enhancing the application management accuracy by fine-tuning the predetermined rules based on the user feedback. In this way, the installed applications can be adequately managed by the application management module 102 with less user intervention, thus improving user experience of using the user device 112.

The aforementioned judgment principle employed for application management, including application updating and application uninstalling/deleting, may also be employed for application recommendation. Please refer to FIG. 3, which is a block diagram illustrating an application recommendation module according to an embodiment of the present invention. The application recommendation module 300 is arranged to automatically determine an application recommendation result ARR. For example, the application recommendation result ARR may be referenced by a user device (e.g., a smartphone or tablet) 312 to show an application hot zone on a display screen of the user device 312, where the application hot zone shows application icons of recommended applications indicated by the application recommendation result ARR. If a recommended application is not installed in the user device 312 yet, the recommended application can be downloaded from the server device 314 to the user device 312 and then installed in the user device 312. If a recommended application is already installed in the user device 312, the recommended application can be directly selected and executed by the user device 312.

Figure 3:
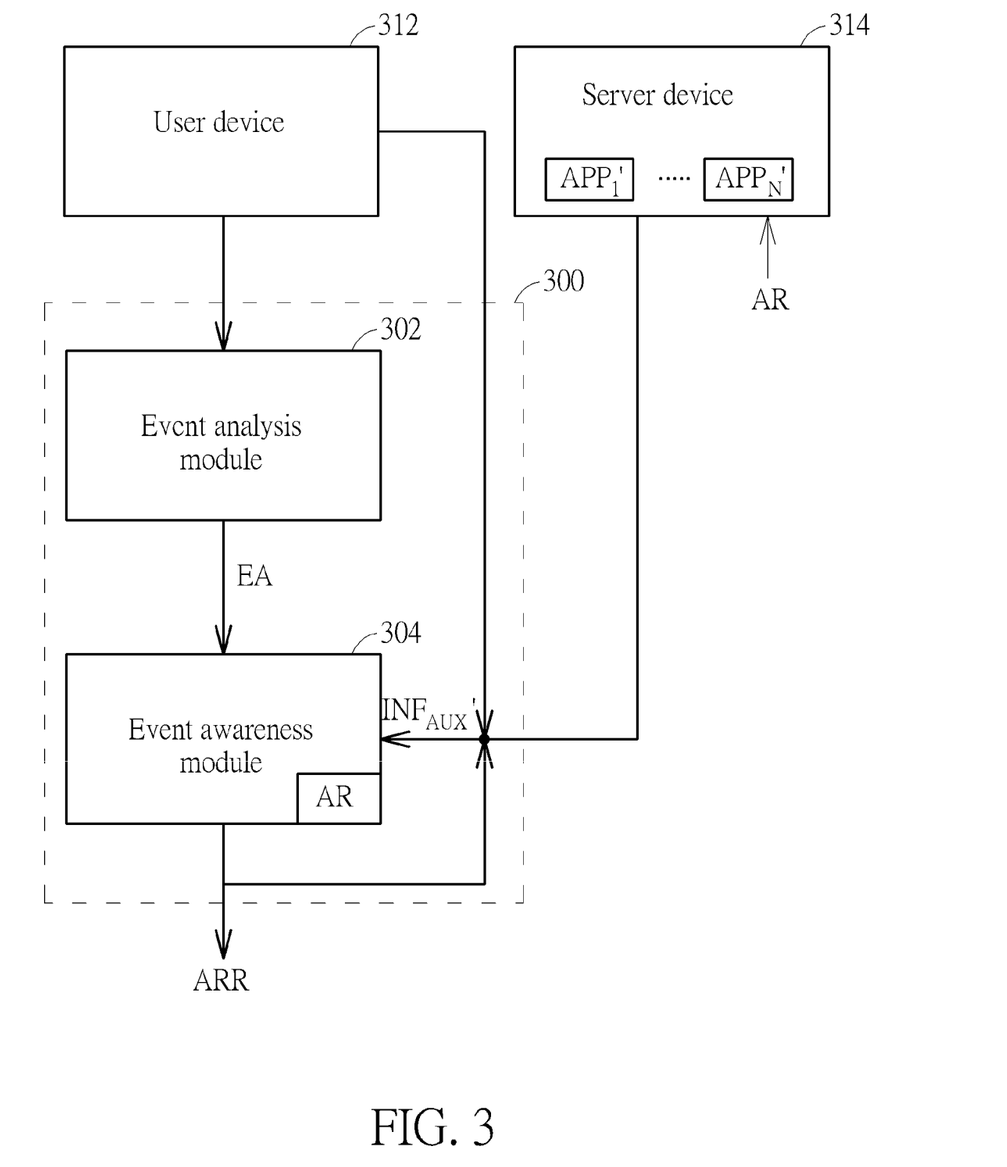
FIG. 3 is a block diagram illustrating an application recommendation module according to an embodiment of the present invention.

As shown in FIG. 3, the application recommendation module 300 includes an event analysis module 302 and an APP awareness module 304. The event analysis module 302 is arranged to detect and analyze an event, and accordingly generate an event analysis result EA, where the event analysis result EA is referenced by the APP awareness module 304 for determining an application recommendation range AR. The event may be triggered by location or time. For example, the user device 312 may be equipped with a global positioning system (GPS) receiver. Thus, the location of the user device 312 is monitored by the event analysis module 302. When the event analysis module 302 detects that the user device 312 moves for a long distance, the event analysis module 302 may generate the event analysis result EA indicative of a travel event. Hence, the application recommendation range AR is directed to travel-related applications, such as map applications, restaurant applications, hotel applications, city navigation applications, WiFi search applications, etc. Besides, the local date and local time of the user device 312 may also be monitored by the event analysis module 302. When the event analysis module 302 detects that today is a holiday, the event analysis module 302 may generate the event analysis result EA indicative of a holiday event. Hence, the application recommendation range AR is directed to holiday-related applications such as game applications.

In general, the server device 314 has a variety of applications. The application recommendation range AR is therefore used to narrow down the search range of recommended applications. More specifically, the APP awareness module 304 determines a plurality of candidate applications $APP_1'$-$APP_N'$ according to the application recommendation range AR, and then selects recommended applications from the candidate applications $APP_1'$-$APP_N'$. The application recommendation range AR may define a single category (e.g., a game category) or a combination of multiple categories (e.g., a game category and a sports category). Besides, the application recommendation range AR may define a single selection rule or a combination of multiple selection rules. In short, with a proper setting of the application recommendation range AR, the search burden of the application recommendation module 304 can be eased. It should be note that one or more of the candidate applications $APP_1'$-$APP_N'$ may be installed in the user device 312 already or none of the candidate applications $APP_1'$-$APP_N'$ is installed in the user device 312 yet.

The APP awareness module 304 is arranged for receiving auxiliary information $INF_{AUX}'$, and analyzing the auxiliary information $INF_{AUX}'$ based on a plurality of predetermined rules. Hence, the APP awareness module 304 generates at least one analysis result for each candidate application based on at least one predetermined rule. After obtaining the analysis result(s) of each of the candidate applications $APP_1'$-$APP_N'$, the APP awareness module 304 refers to the analysis results of the candidate applications $APP_1'$-$APP_N'$ to automatically determine the application recommendation result ARR of recommended applications selected from the candidate applications $APP_1'$-$APP_N'$. Further details of the APP awareness module 304 are described as below.

Figure 4:
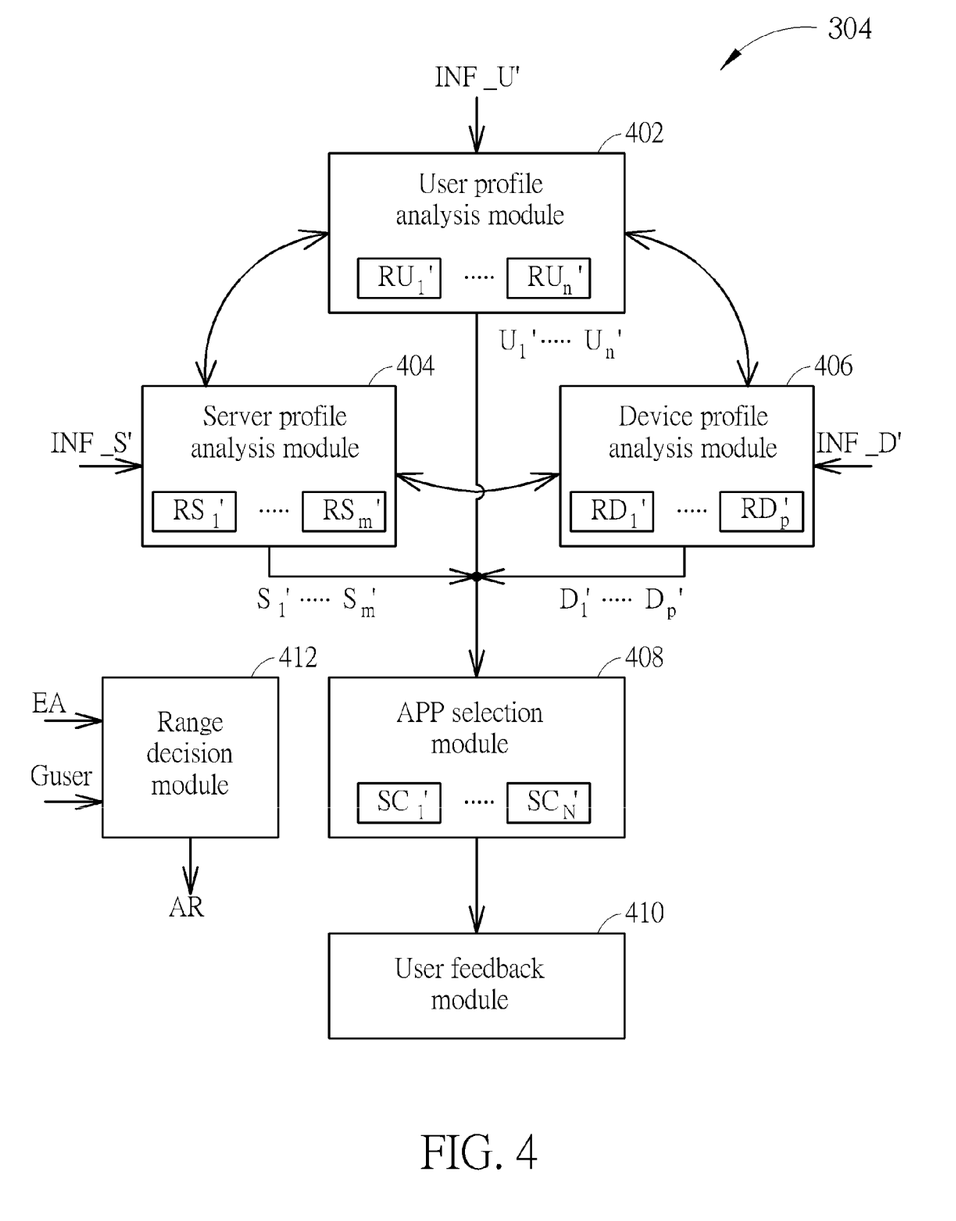
FIG. 4 is a block diagram illustrating an exemplary implementation of the APP awareness module shown in FIG. 3.

FIG. 4 is a block diagram illustrating an exemplary implementation of the APP awareness module 304 shown in FIG. 3. The APP awareness module 304 includes a user profile analysis module 402, a server profile analysis module 404, a device profile analysis module 406, an APP decision module 408, a user feedback module 410, and a range decision module 412. The range decision module 412 is arranged to determine the application recommendation range AR used for determining the candidate applications $APP_1'$-$APP_N'$. In this embodiment, the range decision module 412 may determine the application recommendation range AR by referring to at least one of the event analysis result EA and a user group $G_{user}$ to which a user of the user device 312 belongs. For example, different users may be categorized into different user groups since different users may have different favorite applications. Thus, based on the user group $G_{user}$ to which a user of the user device 312 belongs, the search range of the recommended applications can be narrowed down for achieving better application recommendation performance.

The aforementioned auxiliary information $INF_{AUX}'$ may include a user profile data INF_U', a server profile data INF_S' and/or a device profile data INF_D'. In a preferred embodiment, the auxiliary information $INF_{AUX}'$ to be analyzed by the APP awareness module 304 includes different profile data. Specifically, all of user profile data INF_U', server profile data INF_S' and device profile data INF_D' may be processed by the APP awareness module 304 for better application recommendation performance. However, this is not meant to be a limitation of the present invention.

The user profile data INF_U' is maintained and provide by the user device 312, and may include user preference information. For example, the user profile data INF_U' may indicate a user-defined recommended category, a current location of the user device 312, user's preference of applications (i.e., the user favors free applications or pay applications), etc. The server profile data INF_S' is maintained and provided by the server device 314, and includes application information of the candidate applications $APP_1'$-$APP_N'$. For example, regarding each of the candidate applications $APP_1'$-$APP_N'$, the server profile data INF_S' may indicate the number of download times of the candidate application, the user average evaluation of the candidate application, the application size of the candidate application, the price of the candidate application, etc. The device profile data INF_D' is maintained and provided by the user device 312, and includes device capability information related to execution of the candidate applications $APP_1'$-$APP_N'$. For example, the device profile data INF_D' may indicate the CPU clock rate, the GPU clock rate, the panel resolution, the wireless connectivity speed, etc. In other words, the device profile data INF_D' includes resource information which indicates whether a candidate application can smoothly run on the user device 312.

As mentioned above, the application recommendation module 304 analyzes the auxiliary information $INF_{AUX}'$ based on many predetermined rules to generate analysis result(s) for each candidate application. Hence, the user profile analysis module 402 is configured to have predetermined rules $RU_1'$-$RU_n'$ defined therein, the server profile analysis module 404 is configured to have predetermined rules $RS_1'$-$RS_m'$ defined therein, and the device profile analysis module 406 is configured to have predetermined rules $RD_1'$-$RD_p'$ defined therein. For each of the candidate applications $APP_1'$-$APP_N'$, the user profile analysis module 402 generates analysis results $U_1'$-$U_n'$ by checking the predetermined rules $RU_1'$-$RU_n'$ based on the user profile data INF_U', the server profile analysis module 404 generates analysis results $S_1'$-$S_m'$ by checking the predetermined rules $RS_1'$-$RS_m'$ based on the server profile data INF_S', and the device profile analysis module 406 generates analysis results $D_1'$-$D_p'$ by checking the predetermined rules $RD_1'$-$RD_p'$ based on the device profile data INF_D'. It should be noted that the number of the predetermined rules defined in each analysis module may be adjusted, depending upon actual design requirement/consideration. Further, the predetermined rules employed for application recommendation are not the same as that employed for application management.

In one exemplary design, the user profile analysis module 402, the server profile analysis module 404 and the device profile analysis module 406 may operate separately. Several examples are given as below. However, this is not meant to be a limitation of the present invention. In another exemplary design, the user profile analysis module 402, the server profile analysis module 404 and the device profile analysis module 406 may exchange information with one another. Therefore, when one of the analysis modules is checking if a predetermined rule is met, additional information provided by another of the analysis modules may also be referenced to make a decision.

Regarding the user profile analysis module 302, one predetermined rule $RU_1'$ may check if the candidate application belongs to the user-defined recommended category. When the predetermined rule $RU_1'$ is met, the analysis result $U_1$ is set by a first logic value (e.g., 1) to indicate that the candidate application should be recommended; otherwise, the analysis result $U_1'$ is set by a second logic value (e.g., 0) to indicate that the candidate application should not be recommended. Another predetermined rule $RU_2'$ may check if the candidate application is suitable for the current location of the user device 112. When the predetermined rule $RU_2'$ is met, the analysis result $U_2'$ is set by the first logic value (e.g., 1) to indicate that the candidate application should be recommended; otherwise, the analysis result $U_2'$ is set by the second logic value (e.g., 0) to indicate that the candidate application should not be recommended. Another predetermined rule $RU_3'$ may check if the candidate application is a desired application of the user (i.e., a free application when the user favors free applications or a pay application when the user favors pay applications). When the predetermined rule $RU_3'$ is met, the analysis result $U_3'$ is set by the first logic value (e.g., 1) to indicate that the candidate application should be recommended; otherwise, the analysis result $U_3'$ is set by the second logic value (e.g., 0) to indicate that the candidate application should not be recommended.

Regarding the server profile analysis module 304, one predetermined rule $RS_1'$ may check if the number of download times is larger than a threshold (e.g., 100K). When the predetermined rule $RS_1'$ is met, the analysis result $S_1'$ is set by the first logic value (e.g., 1) to indicate that the candidate application should be recommended; otherwise, the analysis result $S_1'$ is set by the second logic value (e.g., 0) to indicate that the candidate application should not be recommended. Another predetermined rule $RS_2'$ may check if the user average evaluation is higher than a threshold (e.g., 4-star rating). When the predetermined rule $RS_2'$ is met, the analysis result $S_2'$ is set by the first logic value (e.g., 1) to indicate that the candidate application should be recommended; otherwise, the analysis result $S_2'$ is set by the second logic value (e.g., 0) to indicate that the candidate application should not be recommended. Another predetermined rule $RS_3'$ may check if the application size is smaller than a threshold (e.g., 50 M bytes). When the predetermined rule $RS_3'$ is met, the analysis result $S_3'$ is set by the first logic value (e.g., 1) to indicate that the candidate application should be recommended; otherwise, the analysis result $S_3'$ is set by the second logic value (e.g., 0) to indicate that the candidate application should not be recommended. Another predetermined rule $RS_4'$ may check if the application price is lower than a threshold (i.e., $2.99). When the predetermined rule $RS_4'$ is met, the analysis result $S_4'$ is set by the first logic value (e.g., 1) to indicate that the candidate application should be recommended; otherwise, the analysis result $S_4'$ is set by the second logic value (e.g., 0) to indicate that the candidate application should not be recommended.

Regarding the device profile analysis module 308, one predetermined rule $RD_1'$ may check if the candidate application can smoothly run on the user device 312. When the predetermined rule $RD_1'$ is met, the analysis result $D_1'$ is set by the first logic value (e.g., 1) to indicate that the candidate application should be recommended; otherwise, the analysis result $S_4'$ is set by the second logic value (e.g., 0) to indicate that the candidate application should not be recommended.

After receiving the analysis results $U_1'$-$U_n'$, $S_1'$-$S_m'$, $D_1'$-$D_p'$ generated for each candidate application, the APP selection module 408 calculates a final score for each candidate application based on the corresponding analysis results $U_1'$-$U_n'$, $S_1'$-$S_m'$, $D_1'$-$D_p'$. Hence, the APP selection module 408 obtains final scores $SC_1'$-$SC_N'$ corresponding to the candidate applications $APP_1'$-$APP_N'$, respectively. In one exemplary design, each of the final scores $SC_1'$-$SC_N'$ may be calculated using following formulas.

$$SCORE_{(user)} = U_1' + U_2' + U_3' + \ldots + U_n' \tag{8}$$

$$SCORE_{(server)} = S_1' + S_2' + S_3' + \ldots S_m' \tag{9}$$

$$SCORE_{(device)} = U_1' + U_2' + U_3' + \ldots + U_p' \tag{10}$$

$$SCORE_{(final)} = SCORE_{(user)} + SCORE_{(server)} + SCORE_{(device)} \tag{11}$$

In an alternative design, each of $SCORE_{(user)}$, $SCORE_{(server)}$ and $SCORE_{(device)}$ may be set by a weighted sum of analysis results.

$$SCORE_{(user)} = +WU_1'*U_1' + WU_2'*U_2' + WU_3'*U_3' + \ldots + WU_n'*U_n' \tag{12}$$

$$SCORE_{(server)} = WS_1'*S_1' + WS_2'*S_2' + WS_3'*S_3' + \ldots + WS_m'*S_m' \tag{13}$$

$$SCORE_{(device)} = WD_1'*U_1' + WD_2'*U_2' + WD_3'*U_3' + \ldots + WD_p'*U_p' \tag{14}$$

The weighting factors $WU_1'$-$WU_n'$, $WS_1'$-$WS_m'$ and $WD_1'$-$WD_p'$ may be configured based on significance of the analysis results (i.e., significance of the predetermined rules). The same objective of obtaining a final score for each candidate application is achieved.

As mentioned above, an analysis result is set by the first logic value (e.g., 1) when it is determined that the candidate application needs to be recommended, and is set by the second logic value (e.g., 0) when it is determined that the candidate application does not need to be recommended. Thus, the larger is a final score $SCORE_{(final)}$ of a candidate application, the priority of selecting the candidate application as a recommended application is higher. Hence, the APP selection module 408 selects the top N candidate applications with final scores larger than that of remaining candidate applications as the recommended applications for the user of the user device 312, and therefore determines the application recommendation result ARR correspondingly. The value N may be any integer, depending upon actual design requirement/consideration.

Figure 5:
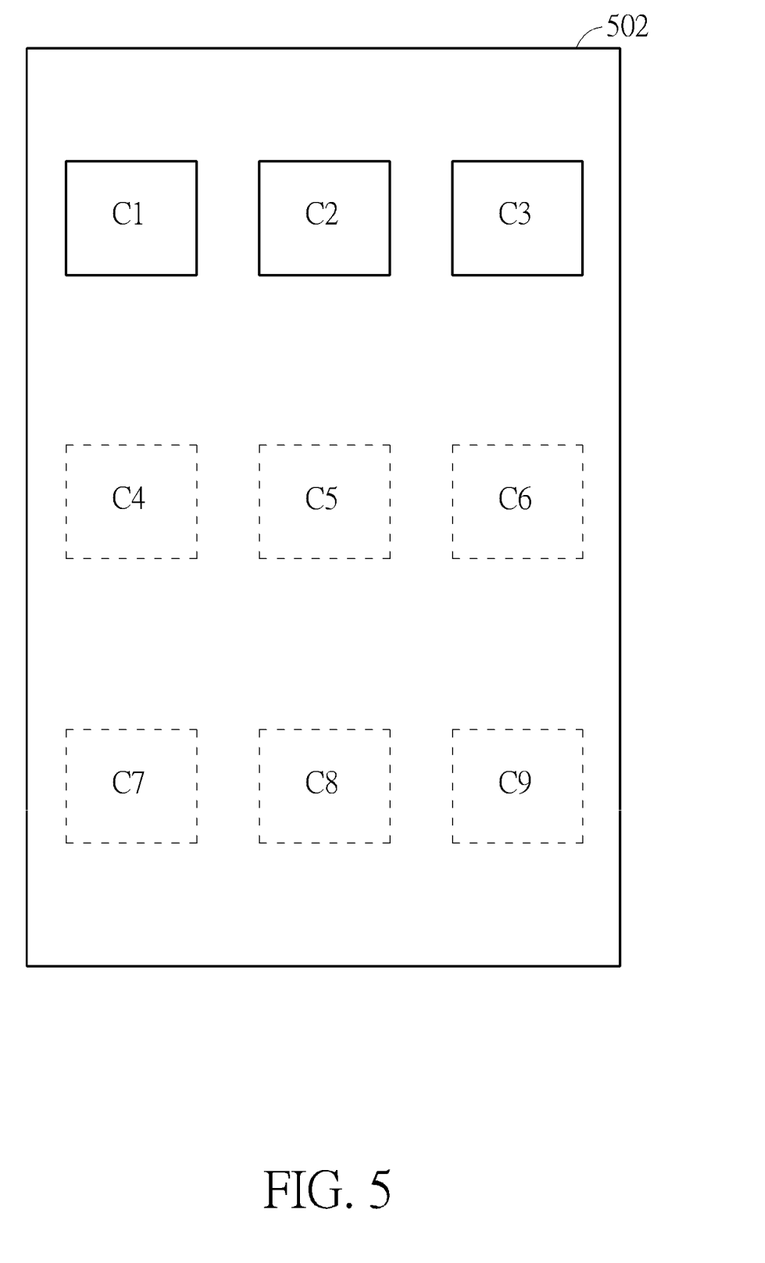
FIG. 5 is a diagram illustrating an example of an application hot zone displayed on a display screen of a user device.

The user interface (UI) of the user device 312 shows an application hot zone based on the application recommendation result ARR. Please refer to FIG. 5, which is a diagram illustrating an example of an application hot zone displayed on a display screen of the user device 312. In this example, the APP selection module 408 determines the application recommendation result ARR by selecting 9 candidate applications, each having a final score larger than that of remaining candidate applications, as the recommended applications. The application icons C1-C9 of the recommenced applications are shown on the display screen 502 of the user device 312. In one exemplary design, the application icons C1-C3 of the recommenced applications which have been installed on the user device 312 are non-transparent icons, while the application icons C4-C9 of the recommenced applications which are not installed on the user device 312 are transparent icons. When the user clicks one of the non-transparent icons C1-C3, a corresponding recommenced application installed in the user device 312 is selected and then executed. When the user clicks one of the transparent icons C4-C9, an installation procedure of a corresponding recommended application will be activated.

In this embodiment, the application awareness module 304 further includes the user feedback module 410 which may analyze the user feedback for rule adjustment. For example, based on a current setting of the predetermined rules, one specific application may be automatically recommended under the control of the application recommendation module 304. However, after the specific application is recommended, the user feedback module 410 finds that the user does not select and use the recommended specific application for a long period of time, which means that the action of automatically recommending the specific application does not meet user's requirement and the current setting of the predetermined rules makes the APP selection module 408 misjudges that the specific candidate application should be recommended. Hence, based on the user feedback, the user feedback module 410 may adjust at least one of the predetermined rules defined in the user profile analysis module 402, the server profile analysis module 404 and the device profile analysis module 406.

For another example, based on a current setting of the predetermined rules, one specific application is not automatically recommended under the control of the application recommendation module 304. However, after the application recommendation result ARR is determined, the user feedback module 410 finds that the user manually selects and uses the specific application which is not a recommended application. This means that the action of automatically recommending applications does not meet user's requirement, and the current setting of the predetermined rules makes the APP selection module 408 misjudges that the specific application should not be recommended. Hence, based on the user feedback, the user feedback module 410 may adjust at least one of the predetermined rules defined in the user profile analysis module 402, the server profile analysis module 404 and the device profile analysis module 406.

To put it simply, the application recommendation module 304 is capable of enhancing the user experience of using the user device 312 by automatically recommending different applications to the user at different locations, different dates and/or different times.

Figure 6:
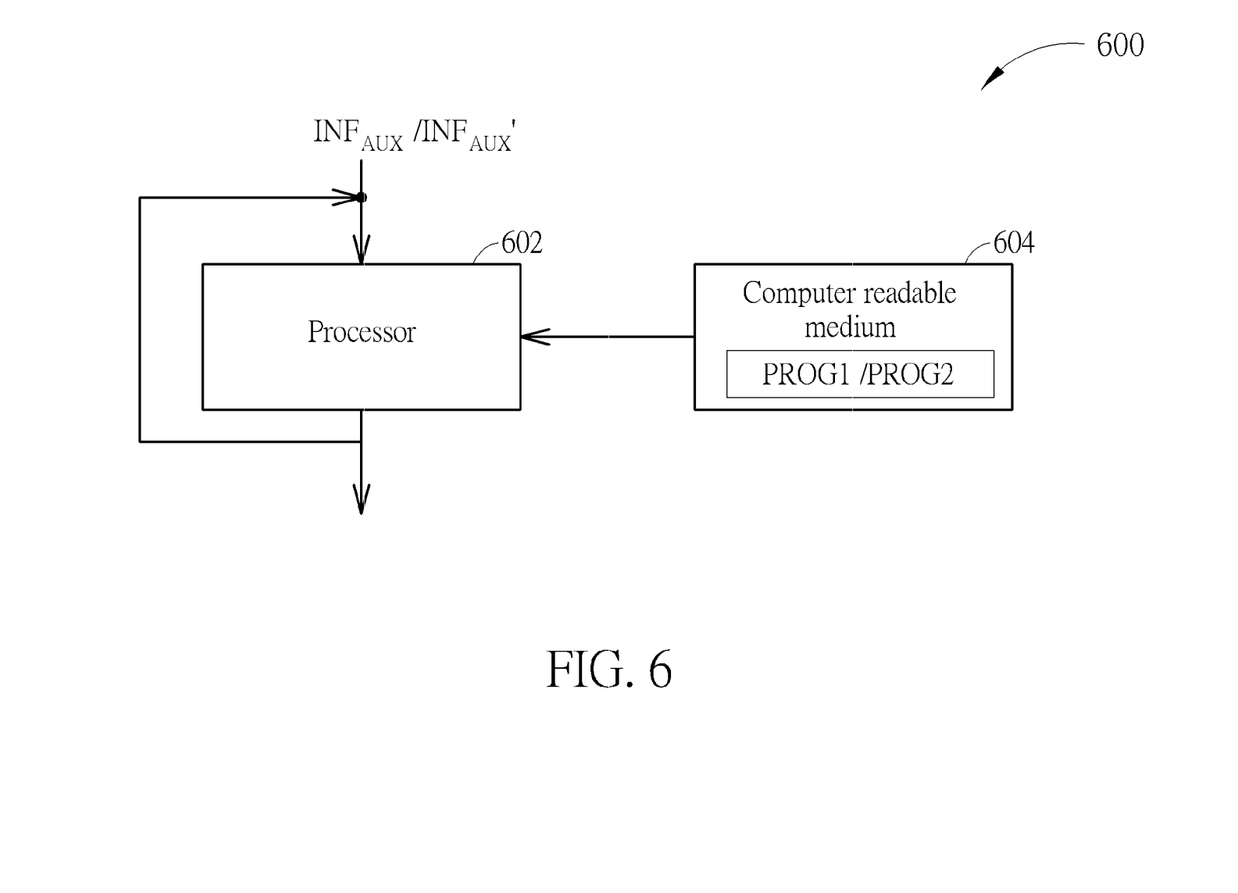
FIG. 6 is a diagram illustrating an electronic device according to an embodiment of the present invention.

The aforementioned application management module 100 and the application recommendation module 300 may be implemented using software. Please refer to FIG. 6, which is a diagram illustrating an electronic device according to an embodiment of the present invention. By way of example, but not limitation, the electronic device 600 may be a portion of the user device 112/312. The electronic device 600 includes a processor 602 and a computer readable medium 604. For example, the computer readable medium 604 may be a non-volatile memory. The computer readable medium 604 stores a first program code PROG1 and/or a second program code PROG2. When the first program code PROG1 is executed by the processor 602, the first program code PROG1 instructs the processor 602 to perform application management, thus realizing the aforementioned application management module 100. When the second program code PROG2 is executed by the processor 602, the second program code PROG2 instructs the processor 602 to perform application recommendation, thus realizing the aforementioned application recommendation module 300.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An application management method, comprising:
receiving auxiliary information associated with a plurality of applications installed on a user device;
analyzing the auxiliary information based on a plurality of predetermined rules, and generating at least one analysis result for at least one of the applications; and
automatically performing application management upon the applications installed on the user device according to analysis results of the applications, wherein the application management is selectively enabled and performed upon the at least one of the applications according to the at least one analysis result.

2. The application management method of claim 1, wherein the application management includes application updating.

3. The application management method of claim 1, wherein the application management includes application uninstalling/deleting.

4. The application management method of claim 1, wherein the auxiliary information comprises a user profile data including information of user behavior of using the applications.

5. The application management method of claim 1, wherein the auxiliary information comprises a server profile data which includes application information of the applications and is maintained on a server device.

6. The application management method of claim 1, wherein the auxiliary information comprises a device profile data including device capability information related to execution of the applications.

7. The application management method of claim 1, wherein the auxiliary information comprises a plurality of different profile data including at least two of a user profile data, a server profile data and a device profile data, where the user profile data includes information of user behavior of using the applications, the server profile data includes application information of the applications and is maintained on a server device, and the device profile data includes device capability information related to execution of the applications.

8. The application management method of claim 1, wherein the step of automatically managing the applications installed on the user device comprises:
   calculating a final score for a specific application installed on the user device based on a plurality of analysis results corresponding to the specific application; and
   selectively performing the application management upon the specific application according to the final score.

9. The application management method of claim 1, further comprising:
   receiving a user feedback; and
   analyzing the user feedback to adjust at least one of the predetermined rules.

10. An application recommendation method, comprising:
   receiving auxiliary information;
   analyzing the auxiliary information based on a plurality of predetermined rules, and generating at least one analysis result for at least one of a plurality of candidate applications; and
   automatically determining an application recommendation result of recommended applications selected from the candidate applications by referring to analysis results of the candidate applications, wherein the at least one of the candidate applications is selectively selected as one recommended application according to the at least one analysis result.

11. The application recommendation method of claim 10, wherein the auxiliary information comprises a user profile data including user preference information.

12. The application recommendation method of claim 10, wherein the auxiliary information comprises a server profile data which includes application information of the candidate applications and is maintained on a server device.

13. The application recommendation method of claim 10, wherein the auxiliary information comprises a device profile data including device capability information related to execution of the candidate applications.

14. The application recommendation method of claim 10, wherein the auxiliary information comprises a plurality of different profile data including at least two of a user profile data, a server profile data and a device profile data, where the user profile data includes user preference information, the server profile data includes application information of the candidate applications and is maintained on a server device, and the device profile data includes device capability information related to execution of the candidate applications.

15. The application recommendation method of claim 10, wherein the step of automatically determining the application recommendation result comprises:
   calculating a final score for the at least one of the candidate applications based on the at least one analysis result; and
   comparing final scores of the candidate applications to determine the application recommendation result.

16. The application recommendation method of claim 10, further comprising:
   receiving a user feedback; and
   analyzing the user feedback to adjust at least one of the predetermined rules.

17. The application recommendation method of claim 10, further comprising:
   determining an application recommendation range according to at least an event; and
   determining the candidate applications according to the application recommendation range.

18. The application recommendation method of claim 10, further comprising:
   determining an application recommendation range based on at least a user group to which a user of the user device belongs; and
   determining the candidate applications based on the application recommendation range.

19. A non-transitory computer readable medium storing a program code, wherein when executed by a processor, the program code instructs the processor to perform following steps for application management:
   receiving auxiliary information associated with a plurality of applications installed on a user device;
   analyzing the auxiliary information based on a plurality of predetermined rules, and generating at least one analysis result for at least one of the applications; and
   automatically performing application management upon the applications installed on the user device according to analysis results of the applications, wherein the application management is selectively enabled and performed upon the at least one of the applications according to the at least one analysis result.

20. A non-transitory computer readable medium storing a program code, wherein when executed by a processor, the program code instructs the processor to perform following steps for application recommendation:
   receiving auxiliary information;
   analyzing the auxiliary information based on a plurality of predetermined rules, and generating at least one analysis result for at least one of a plurality of candidate applications; and
   automatically determining an application recommendation result of recommended applications selected from the candidate applications by referring to analysis results of the candidate applications, wherein the at least one of the candidate applications is selectively selected as one recommended application according to the at least one analysis result.

* * * * *